US005604833A

United States Patent [19]
Kambe et al.

[11] Patent Number: 5,604,833
[45] Date of Patent: Feb. 18, 1997

[54] RESIN-PACKED TYPE OPTICAL FIBER UNIT

[75] Inventors: Hideaki Kambe; Kazuhisa Kashihara, both of Ichihara, Japan

[73] Assignee: The Furukawa Electric Co., Ltd., Tokyo, Japan

[21] Appl. No.: 577,238

[22] Filed: Dec. 22, 1995

[30] Foreign Application Priority Data

Jan. 10, 1995 [JP] Japan ..................... 7-001946

[51] Int. Cl.$^6$ ..................... G02B 6/44
[52] U.S. Cl. ................. 385/104; 385/126; 385/128; 385/103
[58] Field of Search ............ 385/100–114, 123–128

[56] References Cited

U.S. PATENT DOCUMENTS

| | | | |
|---|---|---|---|
| 4,682,850 | 7/1987 | White et al. | 350/96.23 |
| 4,993,804 | 2/1991 | Mayr et al. | 350/96.23 |
| 5,531,064 | 7/1996 | Sawano et al. | 57/204 |

*Primary Examiner*—John Ngo
*Attorney, Agent, or Firm*—Frishauf, Holtz, Goodman, Langer & Chick

[57] ABSTRACT

The present invention include type a risin-packed type fiber unit having an inner layer unit packing member through which a plurality of optical fiber cores are put, and an outer layer unit packing member formed on the outer surface of the inner layer unit packing member, and the resin which constitutes the outer layer unit packing member has a tear elongation ratio of 3.0 to 4.5%.

18 Claims, 3 Drawing Sheets

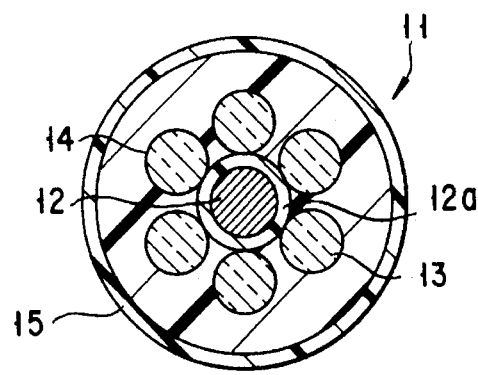
F I G. 5
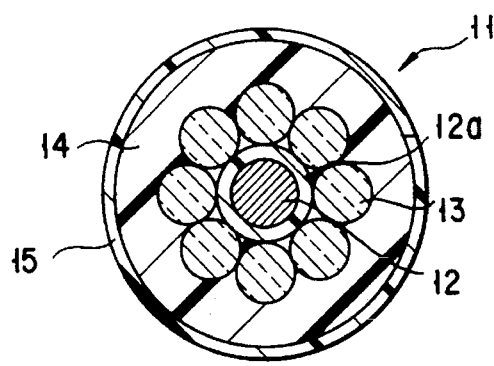
F I G. 6
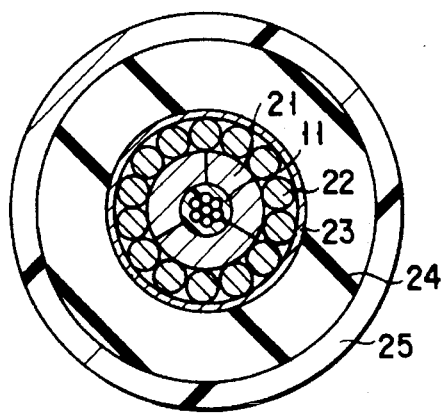
F I G. 7A
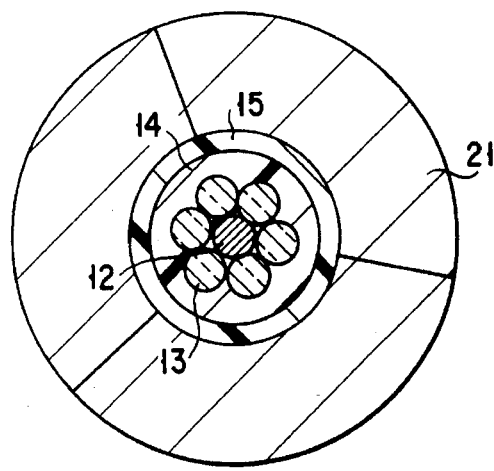
F I G. 7B as shown in FIG. 2B, the cross section of the fiber unit 1b will have a shape having a recess corresponding to the cross sectional shape of the fiber unit 1a, with nail-like end projections C. Consequently, in the case where the end portion of the optical fiber unit 1 is divided in the process and the divisional optical fiber units 1a and 1b are in a course of separating from each other, the fiber unit 1a is caught by the nail-like end projections C of the fiber unit 1b. If the fiber units 1 and 1b are forcibly separated from each other, the optical fiber cores 3a and 3b are broken. Further, the optical fiber cores 3c and 3d are in a process of separating from the optical fiber unit 1b, the optical fiber cores 3c and 3d are caught by the end projections C of the optical fiber unit 1b. If they are forcibly separated, the fiber cores 3c and 3d are broken. As described above, the conventional resin-packed optical fiber unit entails the problem in which an end portion of the unit cannot be easily processed.

RESIN-PACKED TYPE OPTICAL FIBER UNIT

BACKGROUND OF THE INVENTION

1. Field of the Invention

The present invention relates to a resin-packed type optical fiber unit used in the field of optical communications or the like.

2. Description of the Related Art

In the field of optical communications and the like, a resin-packed type optical fiber unit which is made by collecting a plurality of optical fiber cores and integrating them using resin. The resin-packed optical fiber unit has a structure as shown in FIG. 1. As shown in this figure, a resin-packed optical fiber unit 1 comprises a tension member 2 situated at a center of the unit, optical fiber cores 3 arranged to surround the tension member 2, an inner layer unit packing member 4 for fixing the tension member 2 and the optical fiber cores 3, and an outer layer unit packing member 5 applied on the inner layer unit packing member 4. A plurality of the optical fiber units 1 are further collected together to form, for example, an optical fiber cable running along the sea bed (an optical submarine cable).

In this optical fiber unit 1, the outer layer unit packing member 5 is made of a relatively hard resin such as an ultraviolet ray hardening resin (abbreviated as UV resin, hereinafter), and therefore the material 5 serves to protect the optical fiber core 2 from an external force. The inner layer unit packing member 4 is made of a relatively soft resin such as a UV resin, which serves to relax an external force, thus protecting the optical fiber cores 2. In general, UV resins harden quickly and entail high productivities, and therefore they can be utilized as packing members for an optical fiber unit.

The resin material of the outer layer unit packing member 5 should preferably be of a type having a high tear elongation ratio, for the purpose of preventing damages to the optical fiber unit due to the external force. Therefore, conventionally, a resin having a tear elongation ratio of as high as about 7% is used as the material for the outer layer unit packing member.

An optical fiber unit of the above-described type, when used in practice, must be processed at its end portion to peel off the covering and expose the optical fiber core, which is connected to the optical fiber core of another optical fiber unit. Therefore, it is preferable that the optical fiber core be easily separated from the optical fiber unit, more specifically, the packing members which constitute the optical fiber unit.

As can be seen in FIGS. 2A to 2C, in the process of an end portion of the optical fiber unit 1, the end portion of the optical fiber unit 1 is divided into a divisional optical fiber unit 1a which includes an optical fiber cores 3a and 3b, and a divisional fiber unit 1b which includes optical fiber cores 3c and 3d. FIG. 2A is a side view of the optical fiber unit 1 which is subjected to the process of the end portion. FIG. 2B is a cross sectional view of the divisional optical fiber unit 1a. FIG. 2C is a cross sectional view of the divisional fiber unit 1b.

As can be seen in the above figures, when the end portion of the optical fiber unit 1 is divided into two, both of the inner layer unit packing member 4 and the outer layer unit packing member 5 are not equally divided. More specifically, when the end portion of the optical fiber unit 1 is divided, cross sections of these portions will have the following shapes. When the cross section of the divisional optical fiber unit 1a is, for example, quasi-circular such as

SUMMARY OF THE INVENTION

The present invention has been proposed under the above-described circumstances, and the object thereof is to provide a resin-packed type optical fiber unit which is fully protected from an external force, an end portion of which can be easily processed.

According to the present invention, there is provided a resin-packed type fiber unit including an inner layer unit packing member through which a plurality of optical fiber cores are put, and an outer layer unit packing member formed on the outer surface of the inner layer unit packing member, wherein the resin which constitutes the outer layer unit packing member has a tear elongation ratio of 3.0 to 4.5%.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 5 and 6 are cross sections of other examples of the optical fiber unit according to the present invention;

FIG. 7A is a cross sectional view of an optical submarine cable in which an optical fiber unit of the present invention are used; and FIG. 7B is a diagram showing an enlarged view of the optical fiber unit shown in FIG. 7A.

DETAILED DESCRIPTION OF THE PREFERRED EMBODIMENTS

Figure 1:
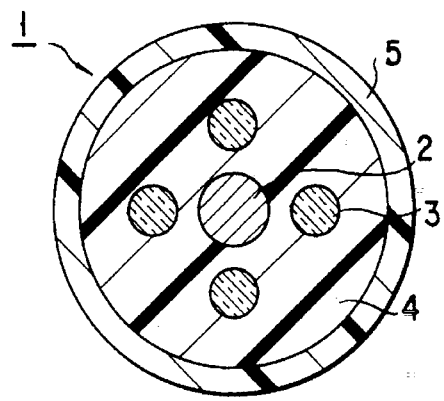
FIG. 1 is a cross sectional view of an optical fiber unit.

The optical fiber unit of the present invention includes an inner layer unit packing member through which a plurality of optical fiber cores are put, and an outer layer unit packing member formed on the outer surface of the inner layer unit packing member, and the feature of the fiber unit is that the resin which constitutes the outer layer unit packing member has a tear elongation ratio of 3.0 to 4.5%. In particular, the resin which constitutes the outer layer unit packing member has a tear elongation ratio of about 3.5%.

As described above, with a tear elongation ratio of the outer layer unit packing member within a range of 3.0 to 4.5%, end portions which can be obtained when the end portion of the optical fiber unit is divided during the process of the optical fiber unit, will have appropriate shapes, with which the divisional optical fiber unit and the fiber cores will not be caught by the end projections. Consequently, disconnection of the optical fiber cores doe not occurs and the optical fiber unit is not destroyed by an external force. It should be noted that the lower the tear elongation ratio, the better the tearing property; however when the tear elongation ratio is lower than 3%, a plastic deformation occurs when an external force is applied, making it impossible to use it as an optical fiber unit. In contrast, if the tear elongation ratio exceeds 4.5%, the tearing property is deteriorated, making it difficult to perform an excellent process of an end portion.

Examples of the resin which constitutes an outer layer unit packing member of the present invention, are UV resin, thermosetting resin, electron-beam hardening resin and the like. In the case of the UV resin, urethane acrylate-based types are particularly preferable. Examples of the resin which constitutes an inner layer unit packing member are UV resin, thermosetting resin, electron-beam hardening resin and the like. Of these, UV resin is preferable in consideration of workability. In this case, the resin which constitutes the outer layer unit packing member should preferably differ from the resin which constitutes the outer layer unit packing member in consideration of the shell effect.

In the present invention, the tear elongation ratio is a value which is obtained from the tear elongation obtained from an examination carried out based on JIS K6301 (1975). More specifically, a test piece (B type) is prepared from a sheet having a thickness of 70 μm, and the tear elongation thereof at a tearing rate of 1 mm/min is measured. From the measured value, a tear elongation ratio is calculated. The tear elongation is obtained by dividing the distance between marked lines on the test piece before the breakage of the test piece due to the tearing, by the distance between the marked lines on the test piece after the breakage thereof. In the case where the resin which constitutes the outer layer unit packing member is a hardening resin, a test piece is prepared from a sheet which is obtained by hardening a resin in advance. For example, in the case of a UV resin, a test piece is prepared from a sheet on which an ultraviolet ray (UV ray) of about 1000 J/cm$^2$ was irradiated in advance by using a metal halide lamp.

An embodiment of the present invention will now be described in detail with reference to accompanying drawings.

Figure 3:
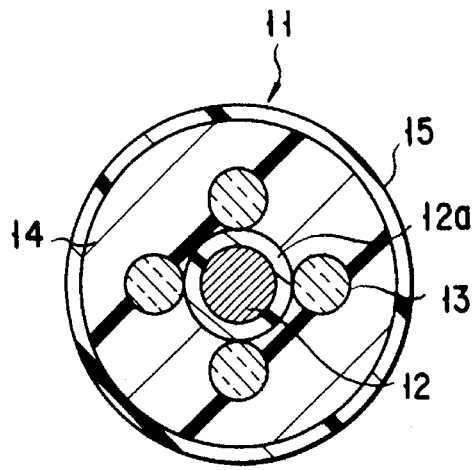
FIG. 3 is a cross section of an example of the optical fiber unit according to the present invention.

FIG. 3 is a cross sectional view of an optical fiber unit according to an embodiment of the present invention. An optical fiber unit 11 comprises a tension member 12 having an overcoat layer 12a to cover it, four optical fiber cores 13 helically arranged around the tension member 12, an inner layer unit packing member in which the tension member 12 and the optical fiber cores 13 are buried and fixed, and an outer layer unit packing member 15 provided around the inner layer unit packing member 14.

The tension member 12 is located at a center portion in terms of cross section of the optical fiber unit, so as to prevent an excessive tension from applying on an optical fiber, and examples of the tension member are a steel wire, piano wire and the like. The outer diameter of the tension member 12 depends on the outer diameter of the optical fiber unit, and should preferably be about 0.3 to 1.2 mm in consideration of space factor. In the case where a steel wire is used as the tension member 12, the surface of the wire may be treated by plating or the like.

Examples of the material of the overcoat layer 12a are UV resin, thermosetting resin, electron-beam hardening resin and the like. The thickness of the overcoat layer should preferably be 0.02 to 0.2 mm in consideration of space factor.

With regard to optical fiber cores 13, they may be four cores arranged as shown in FIG. 3, or six cores or eight cores as shown in FIG. 5 or FIG. 6, respectively. It should be noted that the optical fiber cores 13 are usually arranged around the tension-proof wire 12 along its longitudinal direction.

The outer diameter of the inner layer unit packing member 14 should preferably be in a range of about 1.6 to 2.5 mm, whereas the outer diameter of the outer layer packing member should preferably be in a range of about 2.0 to 3.0.

Another embodiment prepared for clarifying the effect of the present invention, will now be described.

In this embodiment, various types of optical fiber units 11 were prepared with various outer diameters, different numbers of optical fiber cores 13 and various tear elongation ratios of outer layer unit packing member 15. An optical fiber core 13 which constitutes an optical fiber unit 11 of this embodiment was of a type having an outer diameter of 0.4 mm, and a tension-proof wire 12 was a copper-plated piano wire having an outer diameter of 0.6 mm. An overcoat layer 12a was UV resin having a thickness of 0.03 mm.

Resin which constitutes an inner layer unit packing member 14 of this embodiment was the resin under the tradename of DIC FC-2111 (DAINIPPON INK, the tear elongation ratio: 16%), and resin which constitutes an outer layer unit packing member 15 of this embodiment was the UV resin under the name of GRANDICFC-2403A (DAINIPPON INK, the tear elongation ratio: 3.5%).

Figure 4A:
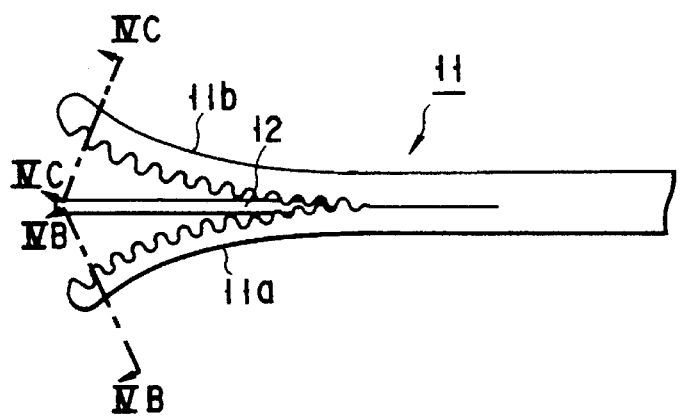
Figure 4B:
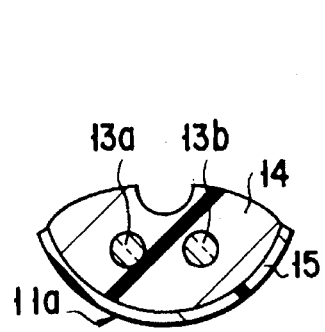
FIG. 4B is a cross section of the optical fiber unit taken along the line IVB—IVB in FIG. 4A.
Figure 4C:
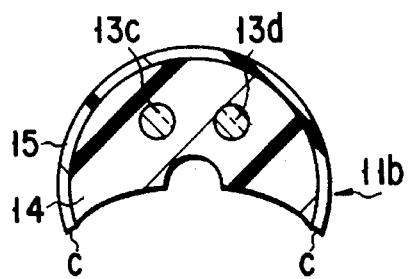
FIG. 4C is a cross section of the optical fiber unit taken along the line IVC—IVC in FIG. 4A.

In this embodiment, as can be seen in FIGS. 4A to 4C, the four-core optical fiber unit 11 is divided into two, namely, a divisional optical fiber unit 11a containing optical fiber cores 13a and 13b, and a divisional optical fiber unit 11b containing optical fiber cores 13c and 13d. More specifically, the optical fiber unit 11 are divided so that the inner layer unit packing member 14 is approximately halved in shape to make the divisional optical fiber units 11a and 11b. FIG. 4A is a side view of the optical fiber unit 11 when the end portion thereof is subjected to the process, FIG. 4B is a cross sectional view of the divisional optical fiber unit 11a, and FIG. 4C is a cross sectional view of the divisional optical fiber unit 11b.

Figure 2A:
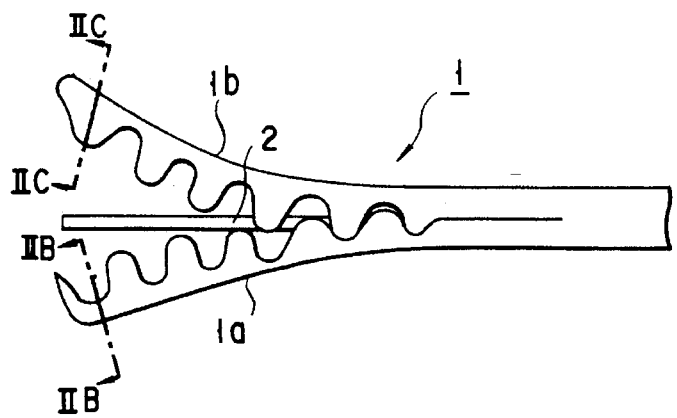
FIGS. 2A and 4A are explanatory diagrams illustrating a scene where an end portion of the optical fiber unit is processed.
Figure 2B:
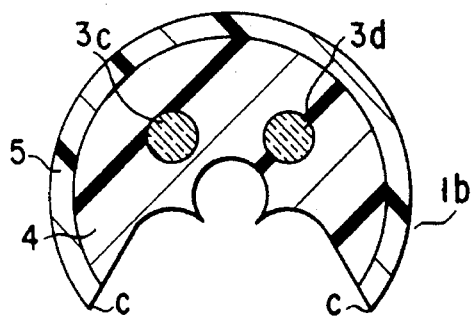
FIG. 2B is a cross section of the optical fiber unit taken along the line IIB—IIB in FIG. 2A.
Figure 2C:
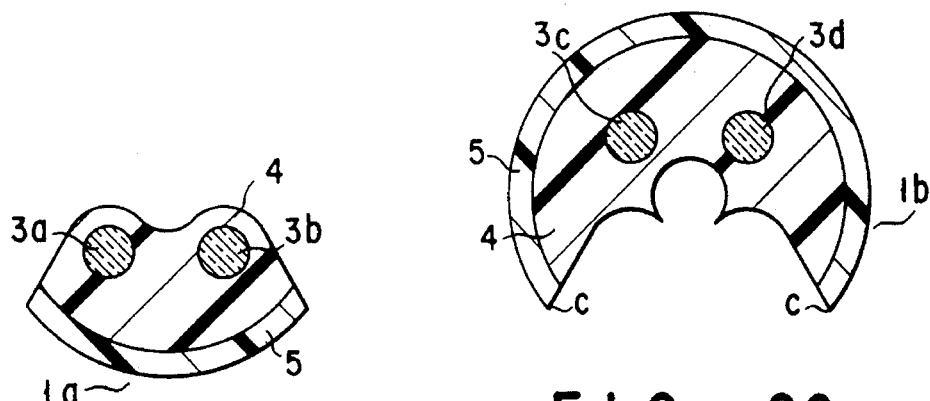
FIG. 2C is a cross section of the optical fiber unit taken along the line IIC—IIC in FIG. 2A.

In the present invention, the torn end projections C of the divisional optical fiber unit 11b which has a large cross section, becomes smaller than the torn end projections C of the conventional divisional optical fiber unit 11b shown in FIG. 2C. Therefore, in the course of separating the divisional optical fiber units 11a and 11b after dividing the optical fiber unit 11, the divisional optical fiber unit 11a is not caught by the torn end projections C of the divisional optical fiber unit 11b. Further, in the course of removing the optical fiber cores 13c and 13d from the divisional fiber unit 11b, the fiber cores 13c and 13d are not caught by the end projections C. Consequently, the end portion of the optical fiber unit 11 can be easily processed at a high accuracy. Further, the optical fiber unit 11 can be fully protected from an external force.

Next, the optical fiber units 11 of different tear elongation ratios of the outer layer unit packing members 15, different numbers of optical fiber cores, and different outer diameters were tested in terms of processability of their end portions. The results are summarized in TABLE 1 provided below. In the test, the end portion of each unit was processed over 20 m in length (in other words, the inner layer unit packing member 14 and the outer layer unit packing member 15 were divided) as can be seen in FIG. 4A. The processability of a sample was marked as NO GOOD if disconnection of an optical fiber core or peeling off of the cover of an fiber core occurred even at one point, and it was marked as GOOD if no disconnection or peeling off occurred at any point.

TABLE 1

| Outer diameter | Tear elongation ratio of resin | | | | | | | | |
|---|---|---|---|---|---|---|---|---|---|
| | 7% | | | 5% | | | 3.5% | | |
| | Number of cores | | | | | | | | |
| | 4-core | 6-core | 8-core | 4-core | 6-core | 8-core | 4-core | 6-core | 8-core |
| 2.0 | NO GOOD | NO GOOD | NO GOOD | NO GOOD | GOOD | GOOD | GOOD | GOOD | GOOD |
| 2.5 | NO GOOD | NO GOOD | NO GOOD | NO GOOD | GOOD | GOOD | GOOD | GOOD | GOOD |
| 3.0 | NO GOOD | NO GOOD | NO GOOD | NO GOOD | NO GOOD | GOOD | GOOD | GOOD | GOOD |

As is clear from the results summarized in TABLE 1, the processability of the end portion is best in the case where the tear elongation ratio of the outer layer unit packing member is 3.5%. More specifically, in the case where the elongation percentage is 3.5%, the processability of the end portion is excellent regardless of the outer diameter of the optical fiber unit or the number of the optical fiber cores. However, when the elongation percentage of the outer layer unit packing member is increased to 5%, the processability of the end portion is deteriorated under the condition where the number of the optical fiber cores is as less as 4. Further, when the elongation percentage is increased to 7%, the processability of the end portion is deteriorated under any condition.

The above optical fiber units were tested in terms of damage-proof property. More specifically, in order to examine the influence of an external force acting when fiber units are actually laid, a change in damage and a change in outer diameter of the fibers, which occurs during a lateral pressure test were measured. The results indicated that each of them exhibits an excellent damage-proof property, and is capable of withstanding an external force. However, when the elongation percentage of the outer layer unit packing member is less than 3%, the outer layer unit packing member is plastically deformed by an external force, and no longer can be used as an optical fiber unit.

Next, with use of an optical fiber unit the tear elongation ratio of the external unit packing member of which is 3.5%, an optical submarine cable as shown in FIGS. 7A and FIG. 7B was prepared. The optical submarine cable had an outer diameter of about 22.5 mm, and mainly comprises an optical fiber unit 11, and a three-divisional steel piece (the first metal layer) 21 provided on the outer circumference of the optical fiber unit 11, a plurality of tension members 22 arranged around the three-divisional steel piece 21, a copper tube (the second metal layer) 23 which covers the tension members 22, an insulation layer 24 formed on the copper tube 23 and a sheath layer 25 formed on the insulation layer 24. Examples of the material of the insulation layer 24 are polyolefin such as polyethylene and the like, and examples of the material of the sheath layer 25 are polyolefine such as polyethylene.

With regard to the optical submarine cable having the above structure, the tear elongation ratio of the outer layer unit packing member is 3.5%, which is within a range of the present invention. Therefore, the end portion of the cable can be easily processed at a high accuracy, and further the cable has a sufficient strength against an external force.

AS described above, the resin-packed type fiber unit of the present invention includes an inner layer unit packing member through which a plurality of optical fiber cores are put, and an outer layer unit packing member formed on the outer surface of the inner layer unit packing member, and the resin which constitutes the outer layer unit packing member has a tear elongation ratio of 3.0 to 4.5%. With this structure, the fiber unit can be fully protected from an external force, and the end portion thereof can be easily and accurately processed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A resin-packed type optical fiber unit comprising:
    an inner layer unit packing member through which a plurality of optical fiber cores are put; and an outer layer unit packing member formed on the outer surface of said inner layer unit packing member; wherein resin which constitutes said outer layer unit packing member has a tear elongation ratio 3.0 to 4.5%.

2. A resin-packed type optical fiber unit according to claim 1, wherein said resin which constitutes said outer layer unit packing member is ultraviolet ray hardening resin.

3. A resin-packed type optical fiber unit according to claim 2, wherein said ultraviolet ray hardening resin is an urethane acrylate-based ultraviolet ray hardening resin.

4. A resin-packed type optical fiber unit according to claim 1, wherein said resin which constitutes said outer layer unit packing member is different from a resin which constitutes said inner layer unit packing member.

5. A resin-packed type optical fiber unit according to claim 4, wherein said resin which constitutes said outer layer unit packing member and said resin which constitutes said inner layer unit packing member are ultraviolet ray hardening resins.

6. A resin-packed type optical fiber unit according to claim 1, wherein said resin which constitutes said outer layer unit packing member has a tear elongation ratio of about 3.5%.

7. A resin-packed type optical fiber unit according to claim 1, wherein a tension member is put through said inner layer unit packing member at substantially a central position in a cross section of said inner layer unit packing member, and said optical fiber cores are helically arranged around said tension member.

8. A resin-packed type optical fiber unit according to claim 7, wherein said tension member is made of a wire selected from the group consisting of a piano wire, a copper-plated piano wire and a zinc-plated piano wire.

9. A resin-packed type optical fiber unit according to claim 7, wherein a protection layer is formed on an outer circumference of said tension member.

10. A resin-packed type optical fiber unit according to claim 9, wherein said protection layer is made of an ultraviolet ray hardening resin.

11. An optical submarine cable comprising:

a resin-packed type optical fiber unit including an inner layer unit packing member through which a plurality of optical fiber cores are put, and an outer layer unit packing member formed on the outer surface of said inner layer unit packing member, wherein resin which constitutes said outer layer unit packing member has a tear elongation ratio of 3.0 to 4.5%;

a tension member provided on said resin-packed type optical fiber unit via a first metal layer; and an insulation layer provided on said tension member via a second metal layer.

12. An optical submarine cable according to claim 11, wherein said resin which constitutes said outer layer unit packing member is ultraviolet ray hardening resin.

13. An optical submarine cable according to claim 12, wherein said ultraviolet ray hardening resin is an urethane acrylate-based ultraviolet ray hardening resin.

14. An optical submarine cable according to claim 11, wherein said resin which constitutes said outer layer unit packing member is different from a resin which constitutes said inner layer unit packing member.

15. An optical submarine cable according to claim 14, wherein said resin which constitutes said outer layer unit packing member and said resin which constitutes said inner layer unit packing member are ultraviolet ray hardening resins.

16. An optical submarine cable according to claim 11, wherein said resin which constitutes said outer layer unit packing member has a tear elongation ratio of about 3.5%.

17. An optical submarine cable according to claim 11, wherein a tension member is put through said inner layer unit packing member at substantially a central position in a cross section of said inner layer unit packing member, and said optical fiber cores are helically arranged around said tension member.

18. An optical submarine cable according to claim 11, wherein a protection layer is formed on an outer circumference of said insulation layer.

* * * * *